US010675700B2

(12) United States Patent
Puchta et al.

(10) Patent No.: US 10,675,700 B2
(45) Date of Patent: Jun. 9, 2020

(54) QUICK-CHANGE COUPLING

(71) Applicant: Eberspächer Exhaust Technology GmbH & Co. KG, Neunkirchen (DE)

(72) Inventors: Christoph Puchta, Quierschied (DE); Achim Glieden, Schiffweiler (DE); Martin Wagmann, St. Wendel (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/263,335

(22) Filed: Jan. 31, 2019

(65) Prior Publication Data
US 2019/0240767 A1   Aug. 8, 2019

(30) Foreign Application Priority Data
Feb. 5, 2018   (DE) .......................... 10 2018 102 456

(51) Int. Cl.
| B23K 37/00 | (2006.01) |
| B23K 9/32 | (2006.01) |
| B23K 31/02 | (2006.01) |
| B23K 37/04 | (2006.01) |
| B23K 20/26 | (2006.01) |
| F01N 13/18 | (2010.01) |

(52) U.S. Cl.
CPC .............. B23K 9/323 (2013.01); B23K 20/26 (2013.01); B23K 31/02 (2013.01); B23K 37/00 (2013.01); B23K 37/0443 (2013.01); F01N 13/1805 (2013.01)

(58) Field of Classification Search
CPC .. F16M 11/041; F16M 2200/02; B23K 37/00; B23K 37/0435; B23K 37/0443; B25B 1/2452; B25B 23/0035
See application file for complete search history.

(56) References Cited

U.S. PATENT DOCUMENTS 5,165,204 A *   11/1992   Luedeke ............... B24B 21/002
                                                    269/58
2017/0001268 A1*   1/2017   Jack ................... B23K 37/0229

FOREIGN PATENT DOCUMENTS

| CN | 202 292 005 U | 7/2012 |
| CN | 203 125 039 U | 8/2013 |
| CN | 103 394 851 A | 11/2013 |
| CN | 103 878 525 B | 6/2014 |
| JP | 2002 161741 A | 6/2002 |

* cited by examiner

*Primary Examiner* — Erin B Saad
(74) *Attorney, Agent, or Firm* — McGlew & Tuttle, P.C.

(57) ABSTRACT

A quick-change coupling (16), for coupling a device carrier (14) to a carrier unit (12) of a welding cell (11), especially for welding together components for internal combustion engine exhaust systems, includes a first coupling unit (18) to be fixed to a carrier unit (12) and a second coupling unit (20) to be fixed to the device carrier (14). One of the coupling units (18, 20) has a pushing meshing recess (24) and the other of the coupling units (18, 20) has a pushing meshing body (26) that can be inserted into the pushing meshing recess (24) in a direction of pushing (R). A positive-locking positioning device (46) is adjustable between a released state and a positive-locking positioning state. With the pushing meshing body positioned meshing with the pushing meshing recess, the positive-locking positioning device in the positive-locking positioning state holds the pushing meshing body in an operating position.

20 Claims, 3 Drawing Sheets

QUICK-CHANGE COUPLING

CROSS REFERENCE TO RELATED APPLICATIONS

This application claims the benefit of priority under 35 U.S.C. § 119 of German Application 10 2018 102 456.8, filed Feb. 5, 2018, the entire contents of which are incorporated herein by reference.

TECHNICAL FIELD

The present invention pertains to a quick-change coupling that can especially be used for coupling a device carrier to a carrier unit of a welding cell, which device carrier accommodates components to be welded together in a position suitable for a welding operation to be carried out, in a welding system, in which, for example, components for internal combustion engine exhaust systems shall be welded together.

BACKGROUND

The welding together of components of internal combustion engine exhaust systems is a working process, in which many such components are to be welded together in the shortest time possible and also various types of components for exhaust systems of different configurations are to be welded together. This makes it necessary to be able to insert the components to be welded together for the construction of an exhaust system into a welding system within a short time and to be able to again remove the components welded together from the welding system in a simple and rapid manner after the welding operation has been carried out, or to be able to make a quick change of the device used for holding the components to be welded together.

SUMMARY

An object of the present invention is to provide a quick-change coupling, with which a device carrier carrying components to be welded together can be coupled to a carrier unit of a welding cell and uncoupled from same in a manner that is simple and fast to carry out.

This object is accomplished according to the present invention by a quick-change coupling for coupling a device carrier to a carrier unit of a welding cell, especially for welding together components for internal combustion engine exhaust systems, comprising a first coupling unit to be fixed to a carrier unit of a welding cell and at least one second coupling unit to be fixed to a device carrier, one coupling unit of the first coupling unit and second coupling unit having a pushing meshing recess and the other coupling unit of the first coupling unit and second coupling unit having a pushing meshing body that can be inserted into the pushing meshing recess in a direction of pushing, further comprising a positive-locking positioning device that can be adjusted between a released state and a positive-locking positioning state, wherein when the pushing meshing body is positioned in a manner meshing with the pushing meshing recess, the positive-locking positioning device holds, in the positive-locking positioning state, the pushing meshing body in an operating position in relation to the pushing meshing recess such that it is positioned against displacement in the pushing meshing recess.

In the quick-change coupling configured according to the present invention, the two coupling units are meshed in relation to one another by means of displacement and held in relation to one another by positive locking in an operating position suitable for a welding operation to be carried out. Both the positive locking and the pushing meshing can be established in a simple and rapid manner and can also be released again, so that the time needed for integration of a device carrier into a welding system and likewise the time needed for removing the device carrier from a welding system are very short, but nevertheless the two coupling units and thus a device carrier and a carrier unit are held in a defined position in relation to one another during the welding operation when the coupling action is carried out.

For a configuration guaranteeing a stable connection, yet allowing the displacement, it is proposed that the pushing meshing recess form an undercut and the pushing meshing body inserted into the pushing meshing recess extend behind the undercut. While a plurality of geometric shapes, for example, a stepped profile, are possible for such an undercut and the complementary profile at the pushing meshing body, a configuration, in which the pushing meshing recess has a dovetail inner profile and the pushing meshing body has a dovetail outer profile, have proven to be especially advantageous.

Since the one coupling unit for providing the pushing meshing recess generally has a structurally more complicated configuration than the other coupling unit, it is further proposed that the first coupling unit be the one coupling unit and the second coupling unit be the other coupling unit. In this way, it is guaranteed that the coupling unit generally having a structurally more complicated configuration can remain at the welding cell or in a welding system.

For a structurally simple configuration, it is proposed that the pushing meshing body be configured as a pushing meshing plate.

In order to be able to bring the two coupling units into a defined position when the meshing is established, it is proposed that an insertion stop defining a maximum insertion position of the pushing meshing body in relation to the pushing meshing recess be associated with the pushing meshing recess.

According to an especially advantageous variant, provisions may be made here for the maximum insertion position to not correspond to the operating position, and that when the pushing meshing body is positioned in the maximum insertion position or in the range of the maximum insertion position and when the positive-locking positioning device is adjusted in the direction of the positive-locking positioning state, the pushing meshing body can be displaced by the positive-locking positioning device in the direction of the operating position. It is guaranteed in this way that redundancy of the positioning areas, acting in a positive-locking manner, does not develop when the positive-locking positioning device acts.

To obtain a stable positive-locking interaction, the positive-locking positioning device may comprise a positive-locking positioning element that can be positioned in a manner meshing with a positive-locking positioning recess.

For a configuration which also prevents an undesired uncoupling or at least makes it difficult, provisions may be made here that when the positive-locking positioning device is adjusted between the released state and the positive-locking positioning state, the positive-locking positioning element can be moved essentially at right angles to the direction of pushing. Further, for an automatic movement of the two coupling units in relation to one another into the operating position, the positive-locking positioning element or/and the positive-locking positioning recess has at least one positioning bevel acting for displacement of the pushing meshing body in the direction of the operating position when the positive-locking positioning device is adjusted in the direction of the positioning state.

Since, as was already mentioned, the coupling unit generally providing the pushing meshing recess is the coupling unit having a complicated configuration and thus, for example, is also provided for remaining at a welding cell, it is further proposed that the positive-locking positioning element be provided at the one coupling unit and the positive-locking positioning recess be provided at the other coupling unit.

In order to be able to establish the meshing state by inserting the other coupling unit into the one coupling unit, it is generally necessary that the two coupling units also have a slight clearance of motion in relation to one another obliquely to the direction of pushing. Especially if a displacement of the two coupling unit in the direction of pushing can be prevented by the positive-locking positioning device, it is especially advantageous for a defined position of the two coupling units suitable for a welding operation when a clamping positioning device, which can be adjusted between a released state and a clamping positioning state, is provided for clamping the pushing meshing body in the pushing meshing recess. For this, for example, provisions may be made for the clamping positioning device to comprise a clamping positioning element that can be moved essentially at right angles to the direction of displacement, when the clamping positioning device is adjusted between the released state and the clamping positioning state.

In an especially advantageous embodiment, the clamping positioning element may be provided at the one coupling unit, so that it becomes possible, furthermore, to associate a common actuating drive with the positive-locking positioning element and with the clamping positioning element for a structurally simple configuration.

A stable, yet easy-to-actuate configuration of the actuating drive may in this case provide that this actuating drive comprises an actuating spindle. In order to be able to dispense with additional safety measures, the actuating drive may advantageously be self-locking. For an increased safety against unwanted uncoupling, it is proposed that a blocking device blocking the actuating drive against adjustment be associated with the actuating drive.

The present invention further pertains to a welding system, especially for welding together components for internal combustion engine exhaust systems, comprising a welding cell with a carrier unit, at least one device carrier for accommodating a plurality of components to be welded together as well as a quick-change coupling configured according to the present invention, wherein the first coupling unit is fixed to the carrier unit and at least one second coupling unit is fixed to a device carrier.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
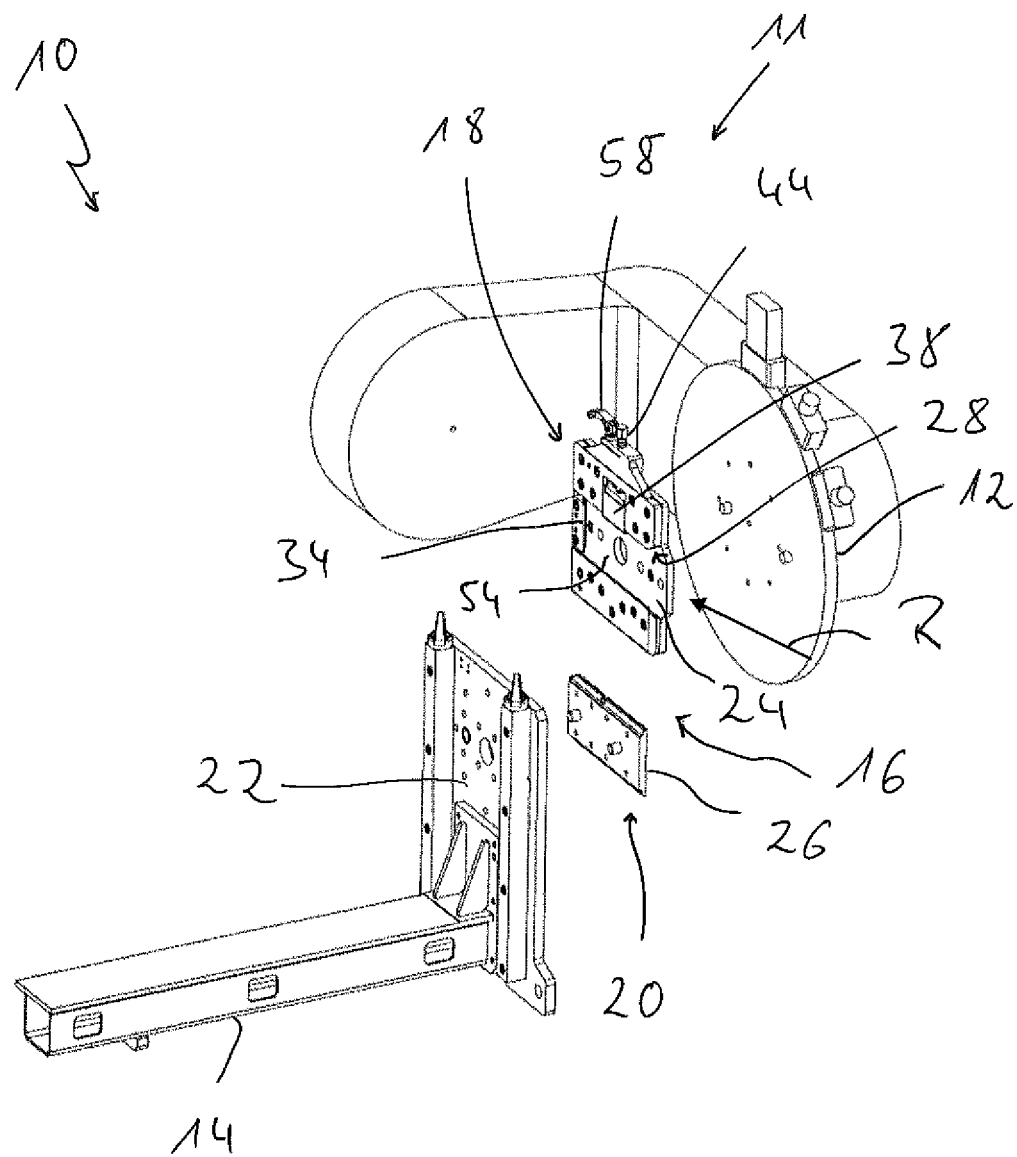
FIG. 1 is a perspective view of the essential system sections of a welding system for welding together components for internal combustion engine exhaust systems.
Figure 2:
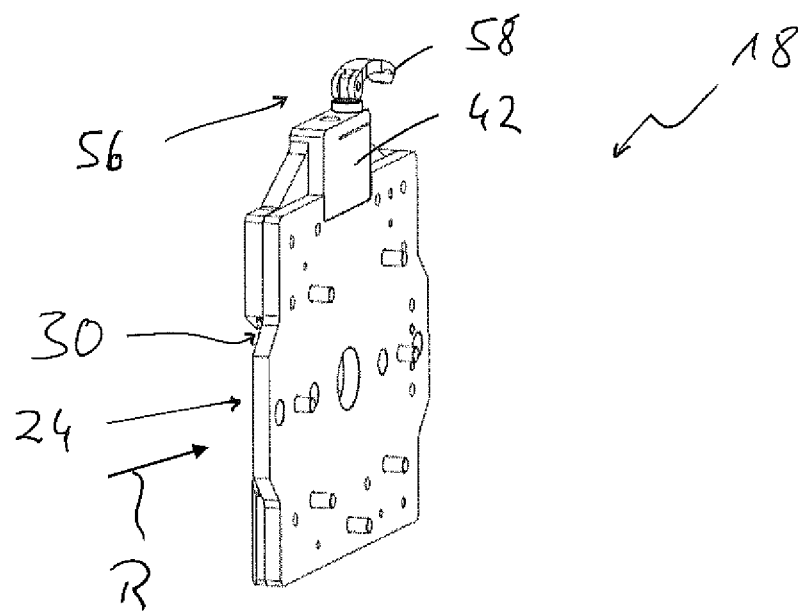
FIG. 2 is a perspective view of a first coupling unit of a quick-change coupling to be fixed to a carrier unit of a welding cell.
Figure 3:
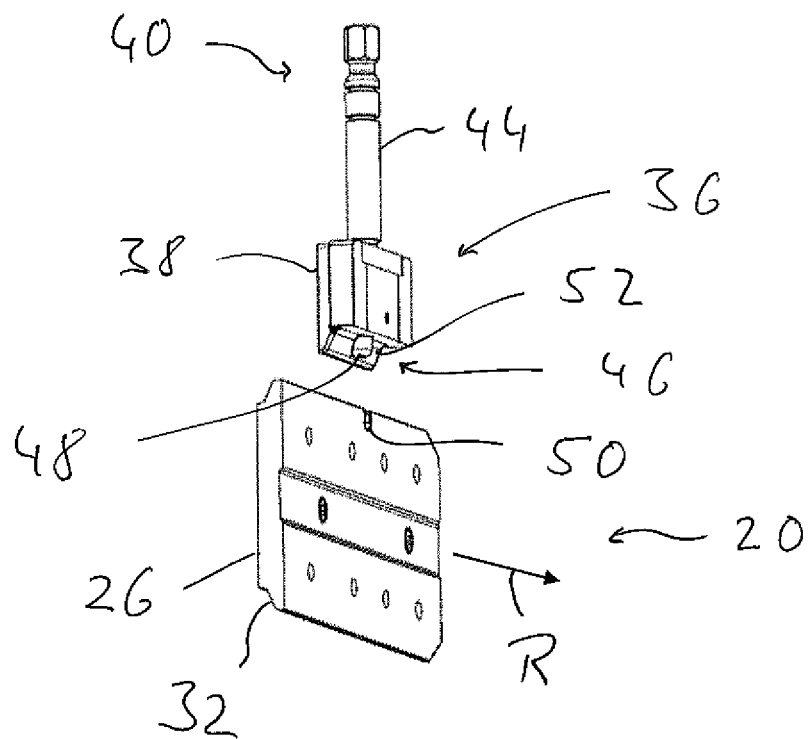
FIG. 3 is a perspective view of a second coupling unit of the quick-change coupling to be fixed to a device carrier with an associated clamping positioning device in a perspective view.
Figure 4:
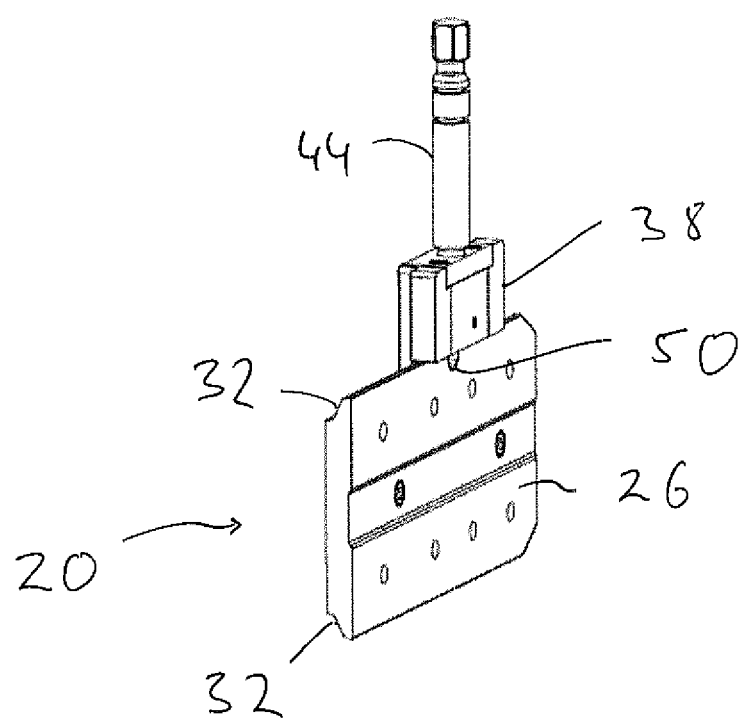
FIG. 4 is a perspective a view of the second coupling unit corresponding to FIG. 3 with the clamping positioning device acting on it.

Referring to the drawings, an essential system sections of a welding system, which is generally designated by 10, for positioning components, for example, for internal combustion engine exhaust systems, which are to be welded together, can be seen in FIG. 1. These system sections comprise a plate-like (plate shaped) carrier unit 12 arranged in a welding cell 11 as well as a device carrier 14 to be fixed to the carrier unit 12 for carrying out welding operations. The components to be welded together can be fixed to the device carrier 14 in a position provided for the welding via positioning elements not shown in FIG. 1.

The device carrier 14 can be fixed to the plate-like carrier unit 12 by means of a quick-change coupling, which is generally designated by 16, so that the components to be welded together, which are carried on the device carrier 14, can be held or arranged in a suitable position in the welding cell 11.

The quick-change coupling 16 comprises a first coupling unit 18 to be fixed to the plate-like carrier unit 12, for example, by screw connection and a second coupling unit 20 to be fixed to the device carrier 14, for example, likewise by screw connection. This second coupling unit 20 can be fixed to a carrier plate 22 provided on the device carrier 14.

The quick-change coupling 16 makes it possible, by coupling the two coupling units 18, 20 of same, to mount the device carrier 14 on the carrier unit 12 in a rapid and detachable manner. In order to make this possible, a pushing meshing recess 24 is provided at the first coupling unit 18. The second coupling unit 20 comprises or is configured with a pushing meshing body 26, which can be inserted with its plate-like structure into the pushing meshing recess 24. In order to generate a fixed, positive-locking meshing by the insertion, the pushing meshing recess forms in its lateral edge areas running in a direction of pushing R an undercut 28, which is configured, for example, in the form of a dovetail inner profile 30. In a corresponding manner, the pushing meshing body 26 is configured as a body extending behind the undercut 28, for example, with a dovetail outer profile 32.

To establish the pushing meshing, the pushing meshing body 26 of the second coupling unit 20, which pushing meshing body 26 is fixed to the device carrier 14, is inserted into the pushing meshing recess 24, for example, essentially in the horizontal direction in the direction of pushing R. The pushing meshing recess 24 is preferably defined by an insertion stop 34 in the direction of pushing R, so that a maximum insertion position of the pushing meshing body 26 into the pushing meshing recess 24 can be predefined by the insertion stop 34. A movement beyond this maximum insertion position is not possible.

In order to prevent the pushing meshing body 26 of the second coupling unit 20 from moving out of the pushing meshing recess, a clamping positioning device 36 is provided at the first coupling unit 18. This clamping positioning device 36 comprises a clamping positioning element 38, which is essentially displaceable obliquely to the direction of pushing R at the first coupling unit 18, and an actuating drive 40 associated with the clamping positioning element 38. The actuating drive 40 in turn is preferably provided with an actuating spindle 44, which is accommodated, for example, in a housing 42 provided at the first coupling unit 18, which actuating spindle 44 preferably has a self-locking configuration and the actuation of which leads to displacement of the clamping positioning element obliquely to the direction of pushing R.

When the pushing meshing body 26 is inserted into the pushing meshing recess 24, the clamping positioning element 38 can be brought into contact with a lateral edge area of the pushing meshing body 26 by moving the clamping positioning element 38 in the direction towards the pushing meshing body 26 and be pressed with pressure against same. In this connection, the contour of the clamping positioning element 38 can be adapted to the contour of the pushing meshing recess 24 to provide the undercut, i.e., of the dovetail inner profile 30, so that the clamping positioning element 38 can overlap the edge area of the pushing meshing body 26, which edge area has a complementary shape and is shaped with a dovetail outer profile 32.

A clamping action that also eliminates a slight clearance of motion between this pushing meshing body 26 and the first coupling unit 18 is generated by the clamping positioning element 38 or the clamping positioning device 36 when the pushing meshing body 26 is positioned in a manner meshing with the pushing meshing recess 24 and, for example, in contact with the insertion stop 34.

In order to be able to reach a defined position of the pushing meshing body 26 especially in the direction of pushing R when the clamping action is generated and when the pushing meshing body 26 is thus fixed in relation to the pushing meshing recess 24, a positive-locking positioning device, which is generally designated by 46, is further provided. This positive-locking positioning device comprises a pin-like positive-locking positioning element 48, which can be provided, for example, at the clamping positioning element 38 or provided by same. A positive-locking positioning recess 50 is provided at the pushing meshing body 26 in association with the positive-locking positioning element 48 such that this positive-locking positioning recess 50 is essentially open at right angles to the direction of pushing R. The positive-locking positioning element 48 and the positive-locking positioning recess 50 are coordinated with one another such that when the positive-locking positioning element 48 is meshed with the positive-locking positioning recess 50, essentially no clearance of motion is present between the pushing meshing body 26 and the clamping positioning element 38 and thus essentially also the first coupling unit 18 accommodating the clamping positioning element 38.

In order to avoid a redundancy in the determination of the position specification by the insertion stop 34, on the one hand, and the positive-locking positioning element 48, on the other hand, when the pushing meshing body 26 is fixed in the pushing meshing recess 24, the maximum insertion position reached when the insertion stop 34 becomes active does not correspond to the operating position of the pushing meshing body 26 in the pushing meshing recess 24 to be provided for a welding operation. Rather, the maximum insertion position is a position, into which the pushing meshing body 26 is brought by moving beyond the operating position.

For insertion of the second coupling unit 20, i.e., of the plate-like pushing meshing body 26, into the first coupling unit 18, i.e., the pushing meshing recess 24, the clamping positioning device 36 and thus also the positive-locking positioning device 46 are at first in a released state. In this state, the pushing meshing body 26 can be inserted unhindered until it comes into contact with the insertion stop 34. Subsequently, the clamping positioning element 38 is moved, and with this the positive-locking positioning element 48 is moved, in the direction towards the pushing meshing body 26 by manual action or, for example, also motor action on the actuating drive 40, i.e., especially the actuating spindle 44. Even before the clamping positioning element 38 can carry out its clamping action, the positive-locking positioning element 48 enters into the positive-locking positioning recess 50. Since these are not in a relative position to one another corresponding to the operating position, a positioning bevel 52 is provided at the positive-locking positioning element 48 in the example shown. Due to the wedge-like action of the positioning bevel 52, it releases a force acting on the pushing meshing body opposite the direction of pushing R when the positive-locking positioning element 48 is moved towards the pushing meshing body 26 and when the positive-locking positioning element 48 enters into the positive-locking positioning recess 50, as a result of which the pushing meshing body 26 is displaced in the direction towards the operating position. In this state, the positive-locking positioning element 48 and the positive-locking positioning recess 50 are correctly aligned in relation to one another, and the positive-locking positioning element 48 may further enter into the positive-locking positioning recess 50 for the defined specification of the pushing meshing body 26, so that the positive-locking positioning state is reached, in which a movement of the pushing meshing body 26 in the direction of pushing R or opposite the direction of pushing R is no longer possible.

In the case of further continued movement of the clamping positioning element 38 also carrying the positive-locking positioning element 48 in the direction towards the pushing meshing body 26, the clamping positioning element 38 comes into contact with the lateral edge area of the pushing meshing body 26 and thus generates a clamping action in a clamping positioning state induced at that time, which clamping action prevents any movement of the pushing meshing body 26 in relation to the first coupling unit 18. This is especially supported by the fact that due to the lateral action of the clamping positioning element 38 on the pushing meshing body 26, the dovetail outer profile and the dovetail inner profile meshing with one another additionally generate a force pressing the pushing meshing body 26 essentially at right angles to the direction of pushing R in the direction of a bottom 54 of the pushing meshing recess 24.

When carrying out a welding operation, in order to prevent vibrations possibly occurring here from leading to an uncoupling of the actuating drive 40, a blocking device, generally designated by 46, may additionally be associated with this actuating drive 40. This blocking device 46 may comprise, for example, accommodated in the housing 42, a clamping element, which can be activated by a clamping lever 58, which clamping element presses in the area of the actuating drive 40 or of the actuating spindle 44 guided in the housing 42 against this actuating spindle 44 and thus prevents a detaching of the actuating drive 40, which has a self-locking configuration already known per se, by means of friction force or/and by means of positive locking.

Should a device carrier 14 carried on the carrier unit 12 be removed from the welding cell of a welding system 10 after carrying out a welding operation, the blocking device 56 can first be deactivated. By acting on the actuating spindle 44, the clamping positioning device 36 and with this the positive-locking positioning device 46 are then brought by lateral retraction of the clamping positioning element 38 and of the positive-locking positioning element 48 into the released state, in which the pushing meshing body 26 together with the device carrier 14 carrying same can be moved laterally out of the pushing meshing recess 24 in order to mesh (engage) with the first coupling unit 18 for a welding operation to be carried out subsequently, for example, another device carrier already equipped with components to be welded together with the pushing meshing body carried on it.

It should be pointed out that the plate-like pushing meshing body 26, which essentially provides the second coupling unit 20, may consist of a single plate-like component, preferably made of metallic material. The second coupling unit 20, which has a more complicated configuration, may preferably be made of metallic material with a base plate to be fixed to the carrier unit 12 and also to provide the bottom 54 of the pushing meshing recess 24, to which base plate side plates providing the dovetail inner profile 30 and an end plate providing the insertion stop 34, each preferably made of metallic material, can be fixed by means of screw connection. The housing 42 accommodating the actuating spindle 44 and the blocking device 56 can be accommodated in the area of one of the side plates. This side plate has, furthermore, a recess, in which the clamping positioning element 38, which is displaceable obliquely to the direction of pushing R, is accommodated or guided.

While specific embodiments of the invention have been shown and described in detail to illustrate the application of the principles of the invention, it will be understood that the invention may be embodied otherwise without departing from such principles.

What is claimed is:

1. A quick-change coupling for coupling a device carrier to a carrier unit of a welding cell, the quick-change coupling comprising:
   a first coupling unit to be fixed to the carrier unit of the welding cell; and
   at least one second coupling unit to be fixed to the device carrier, wherein one of the first coupling unit and the second coupling unit comprises a pushing meshing recess, another of the first coupling unit and the second coupling unit comprises a pushing meshing body and the pushing meshing body is insertable into the pushing meshing recess in a direction of pushing; and
   a positive-locking positioning device adjustable between a released state and a positive-locking positioning state, wherein with pushing meshing body positioned meshing with the pushing meshing recess, the positive-locking positioning device in a positive-locking positioning state thereof holding the pushing meshing body in an operating position, in relation to the pushing meshing recess, and positioned against displacement in the pushing meshing recess, wherein the one of the first coupling unit and the second coupling unit that comprises the pushing meshing recess, further comprises an insertion stop associated with the pushing meshing recess and defining a maximum insertion position of the pushing meshing body in relation to the pushing meshing recess, the maximum insertion position not corresponding to the operating position, wherein, with the pushing meshing body positioned in the maximum insertion position or in the range of the maximum insertion position and with an adjustment of the positive-locking positioning device in a direction of the positive-locking positioning state, the pushing meshing body is displaced by the positive-locking positioning device in a direction of the operating position.

2. A quick-change coupling in accordance with claim 1, wherein:
   the pushing meshing recess comprises an undercut;
   at least a portion of the positive-locking positioning device is located adjacent to the undercut; and
   the pushing meshing body, inserted into the pushing meshing recess, extends behind the undercut.

3. A quick-change coupling in accordance with claim 1, wherein:
   the pushing meshing recess has a dovetail inner profile; and
   the pushing meshing body has a dovetail outer profile.

4. A quick-change coupling in accordance with claim 1, wherein:
   the first coupling unit comprises the pushing meshing recess;
   the insertion stop is located at a spaced location from the pushing meshing body when the pushing meshing body is in the operating position; and
   the second coupling unit comprises the pushing meshing body that is insertable into the pushing meshing recess.

5. A quick-change coupling in accordance with claim 1, wherein the pushing meshing body is configured as a pushing meshing plate, the positive-locking positioning device facing in a first direction, the insertion stop facing in a second direction, the first direction being different from the second direction.

6. A quick-change coupling in accordance with claim 1, wherein:
   the positive-locking positioning device comprises a positive-locking positioning element and a positive-locking positioning recess;
   the positive-locking positioning element faces in a first direction;
   the insertion stop faces in a second direction;
   the first direction is different from the second direction; and
   the positive-locking positioning element is positionable to engage with the positive-locking positioning recess.

7. A quick-change coupling in accordance with claim 6, wherein:
   with the positive-locking positioning device adjusted between the released state and the positive-locking positioning state, the positive-locking positioning element is movable at right angles to the direction of pushing; or
   the positive-locking positioning element or/and the positive-locking positioning recess has at least one positioning bevel acting for guided displacement of the pushing meshing body in the direction of the operating position when the positive-locking positioning device is adjusted in the direction of the positive-locking positioning state.

8. A quick-change coupling in accordance with claim 6, wherein the positive-locking positioning element is provided at the one coupling unit and the positive-locking positioning recess is provided at the other coupling unit.

9. A quick-change coupling in accordance with claim 1, further comprising a clamping positioning device provided for clamping the pushing meshing body in the pushing meshing recess, the clamping positioning device being adjustable between a released state and a clamping positioning state.

10. A quick-change coupling in accordance with claim 9, wherein the clamping positioning device comprises a clamping positioning element moveable at right angles to the direction of pushing when the clamping positioning device is adjusted between the released state and the clamping positioning state.

11. A quick-change coupling in accordance with claim 9, wherein the clamping positioning element is provided at the one of the first coupling unit and the second coupling unit.

12. A quick-change coupling in accordance with claim 6, further comprising a joint actuating drive associated with the positive-locking positioning element and with the clamping positioning element, wherein:
    the actuating drive comprises an actuating spindle; or
    the actuating drive is self-locking; or
    the actuating drive is associated with a blocking device blocking the actuating drive against adjustment; or
    any combination of the actuating drive comprises an actuating spindle and the actuating drive is self-locking and the actuating drive is associated with a blocking device blocking the actuating drive against adjustment.

13. A welding system comprising:
    a welding cell with a carrier unit;
    at least one device carrier for accommodating a plurality of components to be welded together; and
    a quick-change coupling for coupling a device carrier to a carrier unit of a welding cell, the quick-change coupling comprising:
    a first coupling unit fixed to the carrier unit of the welding cell; and
    at least one second coupling unit fixed to the device carrier, wherein one of the first coupling unit and the second coupling unit comprises a pushing meshing recess, another of the first coupling unit and the second coupling unit comprises a pushing meshing body and the pushing meshing body is insertable into the pushing meshing recess in a direction of pushing; and
    a positive-locking positioning device adjustable between a released state and a positive-locking positioning state, wherein with the pushing meshing body positioned meshing with the pushing meshing recess, the positive-locking positioning device in the positive-locking positioning state thereof holding the pushing meshing body in an operating position, in relation to the pushing meshing recess, and positioned against displacement in the pushing meshing recess, wherein the one of the first coupling unit and the second coupling unit that comprises the pushing meshing recess, further comprises an insertion stop associated with the pushing meshing recess and defining a maximum insertion position of the pushing meshing body in relation to the pushing meshing recess, the maximum insertion position not corresponding to the operating position, wherein, with the pushing meshing body positioned in the maximum insertion position or in the range of the maximum insertion position and with an adjustment of the positive-locking positioning device in a direction of the positive-locking positioning state, the pushing meshing body is displaced by the positive-locking positioning device in a direction of the operating position.

14. A welding system in accordance with claim 13, wherein:
    the pushing meshing recess comprises an undercut;
    at least a portion of the positive-locking positioning device is located adjacent to the undercut; and
    the pushing meshing body, inserted into the pushing meshing recess, extends behind the undercut.

15. A welding system in accordance with claim 13, further comprising a clamping positioning device provided for clamping the pushing meshing body in the pushing meshing recess, the clamping positioning device being adjustable between a released state and a clamping positioning state, wherein the clamping positioning device comprises a clamping positioning element moveable at right angles to the direction of pushing when the clamping positioning device is adjusted between the released state and the clamping positioning state.

16. A welding system in accordance with claim 15, further comprising a joint actuating drive associated with the positive-locking positioning element and with the clamping positioning element, wherein:
    the actuating drive comprises an actuating spindle; or
    the actuating drive is self-locking; or
    the actuating drive is associated with a blocking device blocking the actuating drive against adjustment; or
    any combination of the actuating drive comprises an actuating spindle and the actuating drive is self-locking and the actuating drive is associated with a blocking device blocking the actuating drive against adjustment.

17. A quick-change coupling for coupling a device carrier to a carrier unit of a welding cell, the quick-change coupling comprising:
    a first coupling unit to be fixed to the carrier unit of the welding cell;
    a second coupling unit to be fixed to the device carrier, wherein one of the first coupling unit and the second coupling unit comprises a pushing meshing recess, another of the first coupling unit and the second coupling unit comprising a pushing meshing body and the pushing meshing body being insertable into the pushing meshing recess in a direction of pushing; and
    a positive-locking positioning device adjustable between a released state and a positive-locking positioning state, wherein with pushing meshing body positioned meshing with the pushing meshing recess, the positive-locking positioning device in a positive-locking positioning state thereof holding the pushing meshing body in an operating position, in relation to the pushing meshing recess, and positioned against displacement in the pushing meshing recess, wherein the one of the first coupling unit and the second coupling unit that comprises the pushing meshing recess, further comprises an insertion stop associated with the pushing meshing recess and defining a maximum insertion position of the pushing meshing body in relation to the pushing meshing recess, the pushing meshing body being located at a spaced location from the insertion stop when the pushing meshing body is in the operating position.

18. A quick-change coupling in accordance with claim 17, wherein one of the first coupling unit and the second coupling unit comprises a first surface defining a first undercut, the first undercut defining at least a portion of the pushing meshing recess, at least a portion of the positive-locking positioning device being arranged adjacent to one of the first undercut and the second undercut, wherein the one of the first coupling unit and the second coupling unit comprises a second surface and a third surface, the third surface extending between the first surface and the second surface, the second surface defining at least a portion of a second undercut, the positive-locking positioning device comprising a positive locking positioning element, the positive-locking positioning element being adjustable in a first direction of the second undercut and in a second direction away from the second undercut, the first direction and the second direction being parallel to the third surface.

19. A quick-change coupling in accordance with claim 18, wherein the positive-locking positioning element faces the second undercut, the positive-locking positioning element being located opposite the second undercut.

20. A quick-change coupling in accordance with claim 17, wherein the maximum insertion position does not correspond to the operating position, wherein, with the pushing meshing body positioned in the maximum insertion position or in the range of the maximum insertion position and with an adjustment of the positive-locking positioning device in a direction of the positive-locking positioning state, the pushing meshing body is displaced by the positive-locking positioning device in a direction of the operating position.

\* \* \* \* \*